United States Patent [19]

O'Connor

[11] Patent Number: 4,800,113

[45] Date of Patent: Jan. 24, 1989

[54] FIBER REINFORCED THERMOPLASTIC ARTICLES AND PROCESS FOR THE PREPARATION THEREOF

[75] Inventor: James E. O'Connor, Bartlesville, Okla.

[73] Assignee: Phillips Petroleum Company, Bartlesville, Okla.

[21] Appl. No.: 36,622

[22] Filed: Apr. 9, 1987

Related U.S. Application Data

[63] Continuation of Ser. No. 672,762, Nov. 19, 1984, abandoned.

[51] Int. Cl.⁴ .............................................. B32B 7/00
[52] U.S. Cl. ........................................ 428/175; 156/148; 428/245; 428/296; 428/367; 428/373; 428/374
[58] Field of Search ............... 428/175, 245, 296, 367, 428/373, 374, 419; 156/148

[56] References Cited

U.S. PATENT DOCUMENTS

| | | | |
|---|---|---|---|
| 2,313,058 | 3/1943 | Francis | 57/146 |
| 3,064,329 | 11/1962 | Westberg et al. | 28/74 |
| 3,252,484 | 5/1966 | Meyer et al. | 139/426 |
| 3,354,129 | 11/1967 | Edmonds et al. | 260/79 |
| 3,625,809 | 12/1981 | Caroselli | 161/91 |
| 4,282,347 | 8/1981 | Tieszen et al. | 528/388 |
| 4,350,810 | 9/1982 | Tieszen et al. | 528/388 |
| 4,389,453 | 6/1983 | Kitanaka et al. | 428/240 |
| 4,410,385 | 10/1983 | Murphy et al. | 156/181 |
| 4,428,995 | 1/1984 | Yokono et al. | 428/193 |
| 4,539,249 | 10/1985 | Curzio | 264/103 |

FOREIGN PATENT DOCUMENTS

| | | |
|---|---|---|
| 243480 | 11/1960 | Australia . |
| 15147/66 | 2/1967 | Australia . |
| 54544/69 | 11/1970 | Australia . |
| 57374/69 | 1/1971 | Australia . |
| 434193 | 3/1971 | Australia . |
| 459539 | 8/1973 | Australia . |
| 440591 | 8/1973 | Australia . |
| 504323 | 10/1979 | Australia . |
| 509757 | 5/1980 | Australia . |
| 85685/82 | 7/1982 | Australia . |
| 565659 | 9/1983 | Australia . |
| 567115 | 5/1984 | Australia . |
| 0033244 | 8/1981 | European Pat. Off. . |
| 0138294 | 4/1985 | European Pat. Off. . |
| 1200342 | 7/1970 | United Kingdom . |
| 2105247 | 3/1983 | United Kingdom . |

OTHER PUBLICATIONS

Chemical Abstracts, vol. 94, 1981, 104311j.
Plastics Manuf., vol. 94, 1981, p. 87.
Beck, 58th Ann. Conf. Reinf. Plas/Compo. Instit., The Soc. of the Plastics Ind., Inc., δ6B, pp. 1-2, 2/83.
Advanced Materials, vol. 6, No. 6, 4/23/84, issue #0734-7146, vol. 6, No. 6, 4/23/84.
Nasa Tech Briefs, Fall 1982, p. 98.

*Primary Examiner*—Marion C. McCamish
*Attorney, Agent, or Firm*—Williams, Phillips & Umphlett

[57] ABSTRACT

Processes for preparing fiber reinforced thermoplastic articles are provided, for example, thermoplastic fibers and reinforcement fibers can be intermingled to produce a composite yarn, which is used to weave a fabric. then the fabric heated to produce a reinforced article. As another example, thermoplastic yarn and reinforcement yarn can be woven together to produce a composite fabric, which, upon heating, produces a reinforced article.

39 Claims, No Drawings

FIBER REINFORCED THERMOPLASTIC ARTICLES AND PROCESS FOR THE PREPARATION THEREOF

This application is a continuation of application Ser. No. 672,762, filed Nov. 19, 1984, now abandoned.

BACKGROUND

This invention relates to process for the preparation of fiber reinforced thermoplastic articles. In another aspect, this invention relates to novel fiber reinforced thermoplastic articles.

Various methods have been employed to prepare fiber reinforced thermoplastic articles. Each method suffers from drawbacks which prevent the large scale use of the method for the preparation of such articles. Thus, for example, hot melt application of thermoplastic to a reinforcement material is a very energy consuming process since large quantities of thermoplastic resin must be maintained in the melt form during resin application. Solvent application methods introduce the consideration of restricting exposure of both worker and environment to solvents. In addition, considerable process time and energy must be spent driving off excess solvent remaining after resin manipulation is completed. Another problem frequently encountered in the preparation of fiber reinforced thermoplastic articles is the nonuniform contact of thermoplastic resin with reinforcement, thereby resulting in a nonuniform fiber reinforced thermoplastic article.

OBJECTS OF THE INVENTION

An object of the invention is an efficient process for the preparation of fiber reinforced thermoplastic articles.

Another object of the invention is a process for the preparation of uniform fiber reinforced thermoplastic articles.

These and other objects of the invention will become apparent from the disclosure and claims provided herein.

STATEMENT OF THE INVENTION

In accordance with the invention, I have discovered that fiber reinforced articles can be prepared by weaving thermoplastic fiber together with reinforcing fiber and thereafter melting the thermoplastic whereby intimate contact between the reinforcement material and the thermoplastic "matrix" is achieved. In a further embodiment of this invention, a hybrid yarn containing individual filaments of thermoplastic material and reinforcement material can be prepared, woven into a fabric or chopped and layed up as a batt of non-woven fibers. Upon melting of the thermoplastic material, intimate contact between the thermoplastic and reinforcement materials results.

The product fiber reinforced thermoplastic articles are useful in a variety of applications where the chemical properties of the thermoplastic material and the physical integrity imparted by the reinforcement material are required, such as, for example, production of light-weight laminates and the like.

DETAILED DESCRIPTION OF THE INVENTION

In accordance with the present invention, a process is provided comprising intermingling at least one fibrous thermoplastic material and at least one fibrous reinforcement material to produce a composite yarn, weaving the composite yarn into a fabric, and heating the fabric to a temperature at least as high as the melting point of the thermoplastic material for a time sufficient to allow intimate contact between the molten thermoplastic material and the fibrous reinforcement material.

In accordance with another embodiment of the invention, a process is provided comprising intermingling at least one fibrous thermoplastic material and at least one fibrous reinforcement material to produce a composite yarn, passing the composite yarn to a staple cutter to produce a composite staple, laying up the composite staple to produce a bat of composite staple and heating the bat of composite staple to a temperature at least as high as the melting point of the thermoplastic material for a time sufficient to allow intimate contact between the molten thermoplastic material and the fibrous reinforcement material.

In accordance with yet another embodiment of the present invention, a process is provided comprising weaving at least one thermoplastic yarn with at least one reinforcement yarn to produce a composite fabric and heating the composite fabric to a temperature at least as high as the melting point of the thermoplastic yarn for a time sufficient to allow intimate contact between the molten thermoplastic yarn and the reinforcement yarn.

In accordance with a further embodiment of the invention, fiber reinforced thermoplastic articles prepared in accordance with the above described processes are also provided.

THERMOPLASTIC MATERIAL

The process of the present invention can be applied to any thermoplastic fiber. The term "fiber" as used herein, refers to either staple fibers or continuous fibers employed in making of fabrics. Typical examples of such fibers include those prepared from such thermoplastic materials as polyamides such as polycaprolactam and copolyamides, polyesters such as polyethylene terephthalate and copolyesters, polyacrylonitrile and copolymers of acrylonitrile, vinyl and vinylidine polymers and copolymers, polycarbanates, polyurethanes, polyester-amides, polyolefins such as polypropylene, fluorinated polyolefins, poly(arylene sulfifde) compounds such as poly(phenylene sulfide) and the like and mixtures of any two or more thereof. Preferred fibers are prepared from poly(arylene sulfide) compounds since the poly(arylene sulfides) have properties which make them suitable for a wide variety of applications.

Without being limited thereto, uncured or partially cured poly(arylene sulfide) whether hompolymer, copolymer, terpolymer and the like, or a blend of such polymers, can be used in the practice of the invention. The uncured or partially cured polymer is a polymer the molecular weight of which can be increased by either lengthening a molecular chain or by crosslinking or by combination of both by supplying thereto sufficient energy, such as heat. Suitable poly(arylene sulfide) polymers include, but are not limited to, those described in U.S. Pat. No. 3,354,129, incorporated by reference herein. Examples of poly(arylene sulfide) polymers suitable for purpose of the invention include poly(2,4-toluene sulfide), poly(4,4'-biphenylene sulfide) and poly(phenylene sulfide). Because of its availability and desirable properties (such as high chemical resistance, nonflammability, and high strength and hardness) poly(- phenylene sulfide) is the presently preferred poly(arylene sulfide).

The preferred poly(arylene sulfide) for use in this invention will have a flow rate of about 75-800 grams/10 minutes, determined according to ASTM D1238 modified to a temperature of 316° C. and a total weight of 5.0 Kg and preferably will have a flow rate of about 100-500 grams/10 minutes. Most preferably, the poly(arylene sulfide) compound employed in the practice of the invention will be prepared by the processes described in U.S. Pat. Nos. 4,282,347 and 4,350,810, and will have a flow rate of about 160-280 grams/10 minutes. Polymeric material with high flow rates are preferred because intimate contacting between the thermoplastic material and the reinforcement material is most readily achieved with such high flow rate compounds.

REINFORCEMENT

Any fibrous reinforcement material which will not melt or degrade under the treatment conditions detailed more fully below are suitable for use in the practice use of the present invention. Preferably, reinforcement materials employed in the practice of the invention will have melting points higher than the melting points of the thermoplastic materials employed. Suitable materials include, but are not limited to, glass fibers, carbon fibers, aramid fibers such as, for example, poly(p-phenylene terephthalamide), boron fibers, boron nitride fibers, ceramic fibers, metal fibers, such as for example, iron, nickel, chromium, copper, aluminum and the like, and mixtures of any two or more thereof.

CONTACTING PROCEDURES

A wide variety of techniques are suitable for causing the intimate contacting of the fibrous thermoplastic material and at least one fibrous reinforcement material. For example, at least one thermoplastic fiber and at least one reinforcement fiber can be intermingled such as for example by braiding of several fibers together to produce a composite yarn. The composite yarn can then be woven into a fabric which is then ready for further treatment as detailed more fully below. Another means for causing intimate contact of fibrous thermoplastic material and fibrous reinforcement material involves first intermingling at least one thermoplastic fiber and at least one reinforcement fiber as described above to produce a composite yarn. The composite yarn can be then be passed to a staple cutter to produce a composite staple. A composite batt laid up employing the composite staple can be then prepared. Finally, the composite bat can be subjected to further treatment conditions as detailed more fully below. Yet another process for bringing about the intimate contacting of fibrous thermoplastic material and fibrous reinforcement material involves preparing a thermoplastic yarn from the fibrous thermoplastic material and preparing a reinforcement yarn from the fibrous reinforcement material, then weaving together at least one thermoplastic yarn with at least one reinforcement yarn to produce a composite fabric. The composite fabric is then ready for further treatment as detailed more fully below.

The ratio of fibrous thermoplastic material to fibrous reinforcement material useful in the practice of the present invention can vary widely. For purposes of guidance, it is suggested that the quantity of fibrous reinforcement material employed constitute about 40 to about 80 wt. %, based on the total weight of the resulting fabric. Preferably, the fibrous reinforcement material will be employed in the range of about 55 to about 65 wt. %, based on the total weight of the resulting fabric.

TREATMENT CONDITIONS

After the composite fabric or composite bat prepared in accordance with the present invention is formed, the composite materials are subjected to conditions of temperature and pressure for a time sufficient to allow intimate contact between the thermopastic material and the reinforcement material. Suitable temperatures are at least as high as the melting point of the thermoplastic material, but not so high as to cause significant levels of thermoplastic degradation. By way of example, suitable temperatures for use with poly(phenylene sulfide) are broadly about 285° up to about 350° C. Preferably, temperatures ranging from about 300° up to about 330° C. will be employed.

While not essential, the use of pressure to aid bringing about the intimate contacting of the thermoplastic material and the reinforcing material is desirable. Broadly, pressures from atmospheric up to about 500 psig are suitable. Higher pressures are not believed to impart any additional benefits and merely increase equipment and operating costs. Preferably, pressures in the range of about 50 up to about 200 psig will be employed.

The amount of time during which the composite fabric or composite bat is subjected to elevated temperature and pressure is that amount of time necessary to allow the softened or melted thermoplastic material to come into intimate contact with the reinforcement fibers. In addition, it is desirable for the contact time to be sufficient to allow for the escape of any air entrapped in the composite fabric or composite bat to escape form the composite structure. Broadly, contact for about 1 minute up to about 60 minutes is suitable. Preferably, treatment conditions will be maintained for a period of about 5 to about 30 minutes. Most preferably, treatment conditions will be maintained for about 10 up to about 20 minutes, which time period is generally sufficient to ensure intimate contact between the thermoplastic material and the reinforcement fiber without requiring excessive time for the treatment cycle.

EXAMPLE I

This example illustrates the preparation of woven carbon-poly(phenylene sulfide) prepregs, i.e., impregnated composite material suitable for lamination and molding application. Two different types of yarn were twisted together: (a) a carbon fiber yarn of 1717 denier containing 3000 filaments, coated with an epoxy sizing, marketed as Thornel Type 300, WYP 30 1/10 by the Carbon Products Division of Union Carbide Corporation, New York, N.Y. and (b) a 850 denier Ryton® poly(phenylene sulfide) (PPS) yarn having a flow rate of 220±60 g/10 min (determined according to ASTM D1238, modified to a temperature of 316° C. and a total weight, including the weight of the piston, of 5.0 kg), containing 200 filaments, marketed under the product designation of X02 by Phillips Fibers Corporation, Greenville, S.C.

A three-ply hybrid yarn was prepared by twisting two plies of the 850 denier PPS fiber yarn and one ply of the 1717 denier carbon fiber yarn at a low twist of 2.5 t.p.i. (twist per inch) on a commerical twisting machine operated by Phillips Fibers Corporation.

The hybrid 3-ply yarn was then used for weaving two fabrics: one having a 10×10 ends/inch (10 warp ends, 10 fill ends per inch) and the other one having a 16×10 ens/inch plain weave construction. Weaving was done on a commercial weaving loom operated by Phillips Fibers Corporation. The fabric having the 10×10 construction weighed approximately 8.8 oz/yd$^2$; it was 3 yards long and 18 inches wide. The 10×16 fabric weighed approximately 11 oz/yd$^2$; was 1½ yards long and 18 inches wide.

EXAMPLE II

The "prepreg" fabric of Example I prepared from hybrid yarns was laminated by placing from 2 to 10 plies of fabric, cut to a size of about 9"×10", in a 9"×10" metal mold cavity and compressing them at a temperature of about 595° F. (313° C.) and a pressure of about 200 psi for 15 minutes. The composite was then removed from the hot press, placed in a second press at room temperature and allowed to cool under 200 psi pressure. The fabric plies were laid up such that the warp yarns of all layers were oriented in the same direction and the fills yarns were oriented at a 90° angle to the warp yarns. Molded composite sheet height ranged from 0.02 inch for a 2-ply composite to about 0.08–0.09 inches for a 10-ply composite.

Pertinent physical properties of molded composite sheets are listed in Table I.

TABLE I

|  | Sample 1 | Sample 2 |
|---|---|---|
| Number of Plies | 10 | 9 |
| Weave Construction (ends/inch) | 10 × 10 | 16 × 10 |
| Carbon Fiber Content[1], weight % | 61 | 63 |
| Tensile Strength[2], psi | 39,900 | 40,200 |
| Flexural Strength[3], psi | 36,500 | 36,900 |
| Flexural Modulus[3], psi | $5.3 \times 10^6$ | $5.4 \times 10^2$ |
| Shear Strength[4], psi | 3,250 | 3,740 |
| Density[5], g/cc | 1.53–1.56 | 1.51–1.55 |

[1] determined after nitric acid digestion of PPS;
[2] determined according to ASTM D 3039-79 in a INSTRON tensile tester, using 25.4 × 2.5 × 0.2 cm specimens cut from the molded sample with a water-cooled diamond saw; glass fiber-epoxy tabs were bonded to the grip area; and the crosshead speed of the tensile tester was 2 mm/minute.
[3] determined by the three-point bending method according to ASTM D 790-71, employing 12.7 × 1.3 × 0.2 cm specimens, a span to depth ratio of 32:1, and a crosshead speed of 2 mm/minute;
[4] interlaminar shear strength was determined according to ASTM D2344-72, employing a specimen of 19.1 × 6.4 × 2.0 mm size, a span to depth ratio of 4:1, and a crosshead speed of 2 mm/minute;
[5] determined according to ASTM D792-66.

The examples have been provided merely to illustrate the practice of my invention and should not be read so as to limit the scope of my invention in any way. Reasonable variations and modifications, not departing from the essence and spirit of my invention, are contemplated to be within the scope of patent protection desired and sought.

That which is claimed is:

1. A hybrid, low-twist yarn comprising a blend of individual continuous filaments of a poly(arylene sulfide) and individual continuous filaments of a fibrous reinforcement.

2. A yarn as in claim 1 wherein said filaments of said fibrous reinforcement are comprised of carbon.

3. A yarn as in claim 2 wherein said filaments of poly(arylene sulfide) are comprised of poly(phenylene sulfide).

4. A yarn as in claim 3 wherein said poly(phenylene sulfide) polymer has a melt flow in the range of from about 75 to 800 grams per 10 minutes determined according to ASTM D1238 modified to a temperature of 316° C. and a total weight of 5.0 kilograms.

5. A yarn as in claim 4 comprising from about 40 to about 80 weight percent, based on total weight of yarn, of said fibrous reinforcement.

6. A yarn as in claim 5 wherein said yarn is twisted about 2.5 twists per inch.

7. A fabric containing a hybrid, low-twist yarn formed from a blend of individual continuous filaments of a poly(arylene sulfide) and individual continuous filaments of a fibrous reinforcement.

8. A fabric as in claim 7 wherein said filaments of said fibrous reinforcement are comprised of carbon.

9. A fabric as in claim 7 wherein said filaments of poly(arylene sulfide) are comprised of poly(phenylene sulfide).

10. A fabric as in claim 9 wherein said filaments of fibrous reinforcement are comprised of carbon fibers.

11. A fabric as in claim 10 wherein said poly(p-phenylene sulfide) polymer has a melt flow in the range of from about 75 to 800 grams per 10 minutes determined according to ASTM D1238 modified to a temperature of 316° C. and a total weight of 5.0 kilograms.

12. A fabric as in claim 11 comprising from about 40 to about 80 weight percent, based on total weight of fabric, of said fibrous reinforcement.

13. A woven fabric for conversion into a laminate, said fabric being produced by:
   (a) combining carbon fibers and poly(arylene sulfide) fibers into yarn;
   (b) controlling the quantity of said carbon fibers during said combining to be within the range of from about 40 to 80 weight percent on total weight of said yarn; and,
   (c) weaving said yarn into a fabric.

14. A woven fabric for conversion into a laminate, said fabric being produced by:
   (a) combining graphite continuous carbon fibers and continous poly(arylene sulfide) fibers into yarn; and
   (b) weaving said yarn into a fabric.

15. A process comprising subjecting a fabric comprised of a hybrid, low twist yarn formed from a blend of individual continuous filaments of poly(arylene sulfide) and individual continuous filaments of a fibrous reinforcement to a temperature and to a concurrently applied pressure sufficient to cause intimate contact between the thermoplastic and the reinforcement, said temperature being at least as high as the melting point of said poly(arylene sulfide), said subjecting being maintained for a time from about 1 to 60 minutes.

16. A process as in claim 15 wherein said temperature is in the range of from about 285° C. to about 350° C.

17. A process as in claim 16 further comprising forming said fabric into the shape of a composite article.

18. A process as in claim 17 wherein said pressure is applied to said fabric while so formed into the shape of the composite article and is in the range of from about 50 to about 500 psig.

19. A process as in claim 18 further comprising subjecting a plurality of plies of said fabric to said conditions of temperature and pressure to form a laminated, composite article, wherein said laminated composite article is comprised of from about 40 to about 80 weight percent based on total article weight of said fibrous reinforcement material.

20. A process as in claim 19 further comprising subjecting said plurality of plies of said fabric to said conditions of temperature and pressure for a contact time sufficient to allow for the escape of air from the laminated composite article.

21. A process as in claim 20 wherein said plurality of plies is in the range of from 2 to 10.

22. A process as in claim 21 wherein said filaments of the fibrous reinforcement are continuous filaments.

23. A process as in claim 22 wherein said filaments of the fibrous reinforcement are selected from the group consisting of glass, carbon and aramid.

24. A process as in claim 23 wherein said filaments of the poly(arylene sulfide) thermoplastic comprise poly(p-phenylene sulfide) polymer.

25. A process as in claim 24 wherein said filaments of fibrous reinforcement comprise carbon fibers.

26. A process for the preparation of a fiber reinforced thermoplastic article, said process comprising:
    (a) intermingling continuous filaments of a poly(arylene sulfide) and continuous filaments of at least one reinforcement material to produce a composite yarn;
    (b) weaving said composite yarn into a fabric; and
    (c) heating said fabric to a temperature at least as high as the melting point of said poly(arylene sulfide) while maintaining a pressure sufficient to allow intimate contact between said poly(arylene sulfide) and said fibrous reinforcement material for a time of from about 1 to 60 minutes.

27. A process in accordance with claim 26 wherein said intermingling comprises braiding said filaments to produce said composite yarn.

28. A process in accordance with claim 26 wherein said intermingling comprises twisting together said filaments to produce said composite resin.

29. A process in accordance with claim 26 wherein said arylene sulfide polymer comprises poly(phenylene sulfide) having a melt flow of about 75 to about 800 grams per 10 minutes, determined according to ASTM D1238 modified to a temperature of 316° C. and a total weight of 5.0 kg.

30. A process in accordance with claim 26 wherein said heating is carried out at a temperature of from about 285° to about 350° C.

31. A process in accordance with claim 26 wherein after said weaving and before said heating from 2 to 10 plies of said composite fabric are laid together in a laminate mold cavity and said heating is carried out upon said laminate for a time of from about 1 to 60 minutes.

32. A process in accordance with claim 26 wherein said reinforcement material is selected from the group consisting of:
    glass,
    carbon,
    aramid,
    boron,
    boron nitride,
    ceramic,
    iron,
    nickel,
    chromium,
    copper,
    aluminum,
and mixtures of any two or more thereof.

33. A process in accordance with claim 26 wherein the weight % of said reinforcement material is about 40 to about 80%, based on the total weight of said composite yarn.

34. The article produced in accordance with the process of claim 26.

35. A process in accordance with claim 26 wherein the quantity of said reinforcement material employed is maintained within the range of from about 40 up to 80 wt. %, based on the total weight of said composite yarn.

36. A process in accordance with claim 26 wherein from about 2 to 10 plies of said fabric are simultaneously subjected to said heating conditions as set forth in step (c).

37. A process in accordance with claim 26 wherein said fabric is subject to molding prior to being subjected to said heating step (c).

38. A process for producing laminates from a plurality of carbon fibers, and a plurality of poly(arylene sulfide) fibers comprising:
    (a) combining said carbon fibers and said poly(arylene sulfide) fibers into yarn;
    (b) controlling the quantity of said carbon fibers during said combining step to be within the range from about 40 to 80 weight percent based on total weight of said yarn;
    (c) weaving said yarn into a fabric;
    (d) placing from 2 to 10 plies of said fabric together in a mold cavity; and,
    (e) heating said plies under pressure to melt said poly(arylene sulfide) and produce a shaped, carbon-poly(arylene sulfide) laminate.

39. A process for producing laminates from a plurality of individual continuous carbon fibers, and a plurality of individual continuous poly(arylene sulfide) fibers, comprising:
    (a) combining said carbon fibers and said poly(arylene sulfide) fibers into yarn;
    (b) weaving said yarn into a fabric and placing from 2 to 10 plies of said fabric together in a mold cavity; and,
    (c) heating said plies under pressure to melt said poly(arylene sulfide) and produce a shaped carbon-poly(arylene sulfide) laminate.

* * * * *